June 2, 1964

P. M. CUNNINGHAM ET AL 3,135,957

METEOROLOGICAL SATELLITE RADAR

Filed March 20, 1961

INVENTORS
PAUL M. CUNNINGHAM
JOHN F. BECKERICH
BY Moody and Antrim

AGENTS

June 2, 1964   P. M. CUNNINGHAM ET AL   3,135,957
METEOROLOGICAL SATELLITE RADAR
Filed March 20, 1961   2 Sheets-Sheet 2
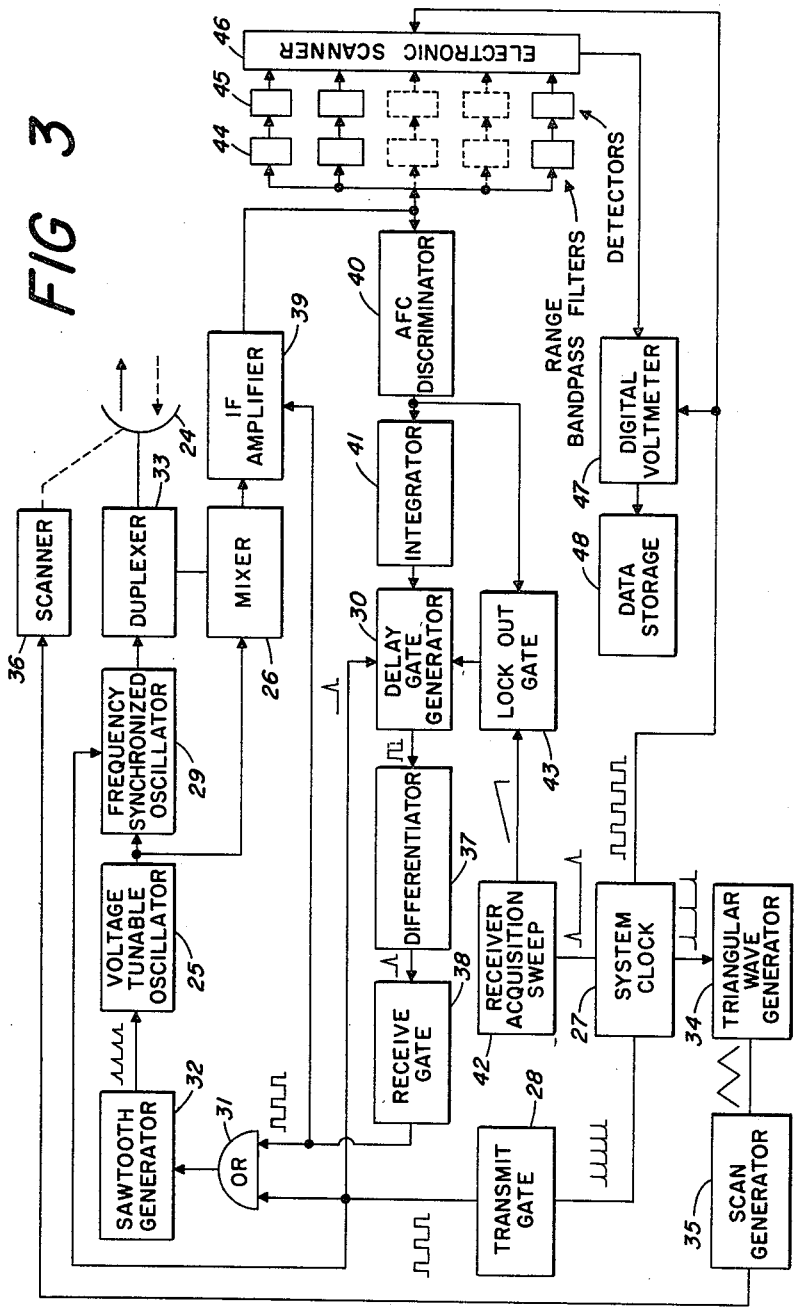
INVENTORS
PAUL M. CUNNINGHAM
JOHN F. BECKERICH
BY
Moody and Antrim
AGENTS

United States Patent Office 3,135,957
Patented June 2, 1964

3,135,957
METEROLOGICAL SATELLITE RADAR
Paul M. Cunningham and John F. Beckerich, Richardson, Tex., assignors to Collins Radio Company, Cedar Rapids, Iowa, a corporation of Iowa
Filed Mar. 20, 1961, Ser. No. 97,079
6 Claims. (Cl. 343—17.2)

This invention pertains to radar systems and particularly to pulsed frequency-modulated radar systems for measuring distances from good remote reflectors to intervening inferior reflectors.

Prior radar systems have indicator or display means for measuring distances from the systems to remote objects. In the present system, the distances between a remote good reflector and intervening inferior reflectors are obtained directly independent of varying distance between the radar system and the good reflector. In prior pulse systems, the receiving periods may follow immediately after transmission of pulses of short duration so that a relatively short distance between the system and the reflecting objects may be measured. The peak power of signal pulses required in systems of this type are considerably greater than that required in frequency-modulated systems.

In frequency-modulated systems in which the peak power is moderate and the transmission and reception are simultaneous, difficulty is encountered in eliminating interference between the reflected signal and direct radiation from the local transmitting system. Although the present frequency-modulated radar system might be adapted for continuous transmission and reception, it is most readily adapted for measuring distances between reflectors which are quite remote from the system so that alternate periods of substantial duration may be used for transmitting signal of moderate power and receiving reflected signals without interference. For example, the present system may be carried by a satellite which is approximately 300 miles from the surface of the earth, and the system can then be used to measure the distances directly from the surface of the earth to intervening clouds or regions of precipitation. The measurements of distances from the earth, which is a good reflector, to the regions of precipitation, which are inferior reflectors, are independent of the distance between the system and the reflectors.

In the present system, the frequency of the predominant echo signal determines the frequency of operation of a local oscillator so that when the earth's surface is used as a reflector, the echo signal from the earth rather than signal from intervening precipitation controls the frequency of the local signal which is applied to a mixer in receiving circuits. The signal from the controlled local oscillator and the echo signals are mixed to provide difference or beat-frequency signals. The frequency control maintains the frequency of the predominant beat-frequency signal constant such that the echo signal from the earth establishes a constant reference corresponding to the point on the earth's surface from which the predominant echo is received. The weaker beat-frequency signals then have differences in frequencies which are proportional to the distances between the respective regions of precipitation and the earth's surface. Since frequencies of the beat-frequency signals are independent of the distance from the earth's surface to the satellite which is carrying the radar system, the distances between the earth's surface and the precipitation may be measured directly by measuring the frequency of the weaker echo signals.

An object of this invention is to measure distances by radar from a remote good reflector to intervening inferior reflectors independent of the distance between the radar system and the good reflector.

A feature of this invention is the control means responsive to signal from the good reflector for maintaining beat-frequency signals which are derived from echo signals independent of distance between the radar system and the good reflector, so that the frequencies of the beat-frequency signals which are derived from the inferior reflectors are a direct function of the respective distances between the inferior reflectors and the good reflector.

The following description and the appended claims can be more readily understood by reference to the accompanying drawings in which:

FIGURE 3 is a block diagram of a radar system according to this invention; and

Figure 1:
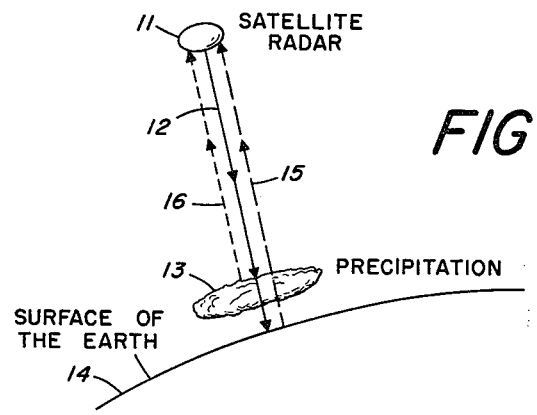
FIGURE 1 shows the principle of operation of the radar system of this invention which is mounted in a satellite to measure the distance of precipitation from the earth's surface.

A pulsed frequency-modulated radar system according to this invention is shown in FIGURE 1 as being applied to measure distances from the earth's surface to intervening regions of precipitation. The minimum distance between the radar system 11 and the nearest reflector is long enough to permit frequency-modulated signal of moderate power to be transmitted over a substantial period before the echo signals are received. The pulse of frequency signal is transmitted as indicated by the line 12 through the cloud formation or precipitation 13 to the surface of the earth 14. Since the surface of the earth is a good reflector, a strong or predominant echo signal is returned to the radar system in the satellite as indicated by line 15, and a weaker echo signal as indicated by line 16 is returned from the region of precipitation 13.

Figure 2:
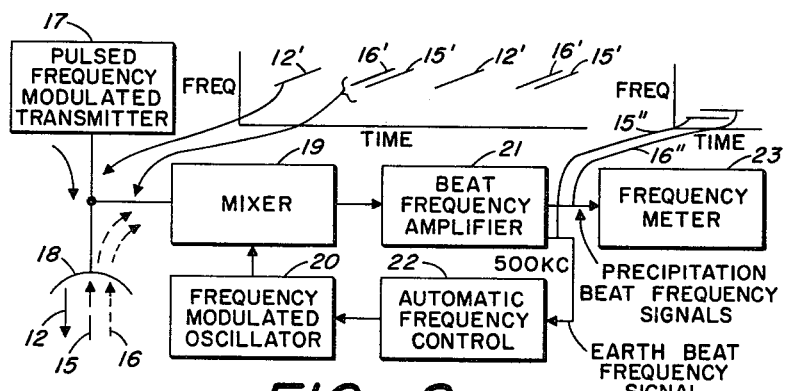
FIGURE 2 is a simplified block diagram of the radar system to show the fundamental operation of the frequency control circuit.

The general principle of operation of the radar system can be described with reference to the simplified block diagram shown in FIGURE 2. Pulses of frequency modulated signal are applied from transmitter 17 to antenna 18 for radiation to the surface of the earth as indicated by line 12. The frequency of the signal during transmission is increased linearly with time. In a system that is carried about 300 miles above the surface of the earth to measure precipitation, a typical period for transmission of frequency-modulated signal as indicated by line 12' might be approximately 3,000 microseconds, during which period the frequency might increase linearly 10 megacycles. The pulses of transmission are spaced at sufficient intervals, for example 10,000 microseconds, to permit the echo signals 15—16 to be received without interference from direct radiation. The instantaneous frequencies of echo signals are functions of the respective distances between their reflectors and the radar system. As indicated in FIGURE 2, the precipitation echo signal 16 as indicated by line 16' has started to be received prior to the echo signal 15 from the surface of the earth as indicated by line 15'. With linear modulation of the transmitted signal, the differences in frequencies of the echo signals from precipitation relative to the frequency of the echo signal from the earth are directly proportional to the respective distances from the surface of the earth to the regions of precipitation which reflected the signals. The differences in frequencies of echo signals with respect to a reference frequency derived from the earth echo are measured directly. The measurement of the distance relative to the surface of the earth is accomplished by converting all echo signals to respective beat-frequency signals in mixer 19, to which is applied signal from oscillator 20 that has its frequency of operation controlled in accordance with the frequency of the echo signal from the surface of the earth.

The predominant beat-frequency which is derived from the surface of the earth is applied from the output of mixer 19 through beat-frequency amplifier 21 to automatic-frequency-control circuits 22. The automatic-frequency-control circuits 22 control the frequency of oscillator 20 for maintaining the beat-frequency for the surface of the earth at a constant reference frequency, for example, 500 kilocycles which is chosen to facilitate construction of the circuits. The local oscillator 20 is frequency modulated so that the frequency of the signal which is applied from its output to mixer 19 varies at the same rate as the frequency of the transmitted signal. The automatic-frequency-control 22 develops a voltage in response to departure of the predominant beat-frequency from 500 kilocycles to change the mean frequency of the local oscillator as required for maintaining the predominant beat-frequency substantially constant.

Weaker echo signals from precipitation are also mixed with the oscillator frequency in mixer 19, and the resulting beat-frequency signals are applied through beat-frequency amplifier 21 to frequency meter 23. Since the mean frequency of oscillator 20 is controlled by the frequency of the predominant echo signal from the surface of the earth, the differences between the predetermined beat-frequency for the predominant echo signal and the beat-frequencies for the precipitation echo signals are proportional to the respective distances between the surface of the earth and the regions of precipitation. For example, in FIGURE 2 the distance between the region of precipitation which has a beat-frequency, indicated by line 16", and the surface of the earth which has a constant beat-frequency, shown by the line 15", is proportional to the difference in frequency between the beat-frequency signals.

A typical system for measuring distances of regions of precipitation above the surface of the earth and for measuring the intensities of precipitation in each of the regions is shown in FIGURE 3. The system is to be carried by a satellite at a distance of about 300 miles above the surface of the earth. The directive antenna 24 oscillates over a 90° arc about an axis mounted in the direction of travel of the satellite to scan transversely over a path that subtends an angle of about 45° from vertical on each side of the satellite. To simplify the explanation of operation, figures within ranges of possible values to be used in operation have been assigned for frequencies and for distances. A 10,000-megacycle signal is radiated every 10,000 microseconds for a duration of 3,000 microseconds. During the 3,000-microsecond interval, the signal is modulated linearly in frequency to increase its frequency 10 megacycles.

Between periods of transmission, echo signal from the surface of the earth is received and the instantaneous frequency of the echo signal controls the starting time of the sweep of tunable oscillator 25. The frequency of the oscillator is thus controlled so that the beat-frequency signal obtained from mixing the predominant echo signal with the local signal in mixer 26 is constant at 500 kilocycles. In the output of mixer 26 the signals of weaker echo signals from regions of precipitation differ in frequency from 500 kilocycles as a function of the distance of the regions of precipitation from the surface of the earth. These beat-frequency signals which are derived from precipitation echoes are passed through band-pass filters, which correspond to different ranges of distances from the surface of the earth, to data storage circuits. The intensity of the reflection from the region of precipitation within each of the ranges of distances is measured and compared with the intensity of the reflection from the earth to provide an indication of the intensity of precipitation within each of the ranges.

In detail, the system clock 27 of FIGURE 3 determines the repetition rate of transmission and provides signal for correlating the scanning of antenna 24 and the recording of data relating to regions of precipitation above the surface of the earth. A sharp pulse every 10,000 microseconds is applied from clock 27 to the input of transmit gate 28. The gate may be a monostable multivibrator having a predetermined operate period and having in its output breakdown voltage control devices for determining output voltage. The gate responds to each input pulse to form a frequency-control pulse which has a duration of 3,000 microseconds and which has during its duration a predetermined constant voltage. The voltage is added to the saw-tooth signal from generator 32 to determine the output frequency of oscillator 25. The output of transmit gate 28 is connected to the oscillator control circuits through the OR gate 31 and is also connected to the enabling circuits of frequency-synchronized oscillator 29 and to the start circuit of delay gate generator 30. The application of the pulse to frequency-synchronized oscillator 29 enables the transmitter circuits for the 3,000-microsecond period. The pulse that is applied through the OR gate 31 starts the sweep of the saw-tooth generator 32 and in addition the voltage is combined with the output of the generator to provide the desired starting frequency for the signal of the voltage tunable oscillator 25.

The slope of the saw-tooth generator 32 is controlled to provide the desired rate of frequency change or modulation in the transmitted signal during the 3,000-microsecond period of transmission. The component of the sweep voltage which is derived from transmit gate 28 determines the frequency of the signal at the start of the sweep. The output of voltage tunable oscillator 25 is connected to the synchronizing circuit of oscillator 29 which supplies frequency-modulated signal at a frequency of approximately 10,000 megacycles. The output of the oscillator is applied through duplexer 33 to directional antenna 24 for radiating the 10,000-megacycle frequency-modulated signal toward the surface of the earth. During the period of transmission the operation of saw-tooth generator 32 has caused the frequency of the transmitted signal to increase linearly 10 megacycles.

One output of the system clock 27 is applied to a triangular-wave generator 34 for synchronizing scanning signal with the recording of data. The output of the triangular-wave generator 34 is connected to a scan generator 35 to develop a control signal for application to the scanner or servo control system 36. Scanner 36 may be a conventional servo system which utilizes potentiometers for determining followup. The scanner which has a period of 1 second is mechanically coupled to antenna 24 to scan the antenna laterally over an arc of 90° about the vertical position.

The trailing edge of the pulse which is applied from transmit gate 28 to delay gate generator 30 is differentiated at the input circuit of the delay gate to start a variable width timing pulse. The delay gate generator 30 may be a monostable multivibrator or phantastron of the type to which is applied control voltages for determining the duration of its unstable state. The output of the delay gate generator 30 is connected through differentiator 37 to the input of a receive gate 38. The differentiator 37 differentiates the trailing edge of the variable width pulse to provide a sharp pulse to trigger the bistable circuit which comprises receive gate 38. The output pulse of the receive gate has a predetermined width greater than 3,000 microseconds and a height which is closely controlled by voltage control circuits that comprise voltage breakdown devices. This pulse of controlled height is applied through the OR gate 31 to saw-tooth generator 32 for enabling the saw-tooth generator to start its sweep and is also applied to the output circuits of the generator to be combined with the sweep voltage for application to voltage tunable oscillator 25. The voltage of the pulse from the output of the receive gate 38 differs from that of the output of transmit gate 28 in the amount necessary to offset the frequency of the voltage tunable oscillator 500 kilocycles at the beginning of its sweep. During the period for reception, the start frequency of oscillator 25 is 500 kilocycles lower than the start frequency for transmission. This 500-kilocycle offset provides a convenient beat-frequency or intermediate frequency for the receiving circuits. The application of voltage pulse from the output of receive gate 38 to the control circuits of intermediate-frequency amplifier 39 enables the receiving circuits.

Reflected signal or echo from the surface of the earth and weaker reflected signals from any intervening regions of precipitation are received by antenna 24 after the end of the 3,000-microsecond period of transmission. The interval between the end of the period of transmission and the start of reception is obviously dependent upon the distance of the satellite above the nearest reflecting surface. The echo signal is returned through the duplexer 33 to the input of the mixer 26. Since the time between the transmitting and the receiving functions is shared, the degree of isolation required between the transmitting circuits and the receiving circuits is only that necessary for protecting the receiving circuits. A simple three-port ferrite T-circulator provides sufficient isolation.

In the mixer 26, the predominant echo signal from the surface of the earth and any minor echo signals that are present are combined with the local signal from the voltage tunable oscillator 25 to produce beat-frequency signals. The frequency of the oscillator is controlled for maintaining the frequency of the beat-frequency signal for the earth at 500 kilocycles. The output of the mixer is connected to intermediate-frequency amplifier 39 which has a wide-band frequency range from 500 kilocycles to 1 megacycle. The output of the intermediate-frequency amplifier 39 is connected to the input circuit of automatic-frequency-control discriminator 40 and to data recording circuits. The automatic-frequency-control discriminator 40 is tuned to 500 kilocycles such that the application of beat-frequency signal from the earth will develop a control voltage having a sense dependent upon the direction of the departure from 500 kilocycles and amplitude dependent upon the extent of the departure in frequency. The output of the automatic-frequency-control discriminator is applied to the control circuits of lock-out gate 43 and also through integrator 41 to a control circuit of delay gate generator 30. The discriminator voltage provides fine instantaneous control of the width of the pulse developed by delay gate generator 30 so as to control the starting time of the frequency-modulated signal of voltage tunable oscillator 25. Obviously, the starting time of the voltage tunable oscillator 25 which has a changing output frequency, determines the instantaneous frequency of signal that is to be combined with the reflected signals and thereby determines the frequencies of the beat-frequency signals applied to intermediate-frequency amplifier 39.

In order for the automatic-frequency-control discriminator 40 to develop the required control voltage for controlling the operation of oscillator 25, the frequency of the predominant beat-frequency signal must be close enough to 500 kilocycles to be passed in substantial amount by the sharply tuned circuits of discriminator 40. In order to vary the starting time of oscillator 25 until a 500-kilocycle beat-frequency is developed, the receiver acquisition sweep circuit 42 has been provided for applying a required initial control voltage or search voltage to delay gate generator 30. Output pulses from the system clock 27 are applied to the receiver acquisition sweep circuit 42 to start the sweep. The output of the sweep circuit 42 is connected to lock-out gate 43 for applying the gradually changing voltage which has been initiated by the clock pulse through the gate to the control circuit of delay gate generator 30. When the voltage that is applied to the generator from the lock-out gate is of a proper value to start oscillator 25 at the time required to provide a beat-frequency of approximately 500 kilocycles between the oscillator signal and the predominant earth signal, voltage is developed at the output of discriminator 40 to operate gate 43 to disconnect the receiver acquisition sweep circuit 42 from delay gate generator 30. The control circuit of delay gate generator 30 has storage means for maintaining the voltage constant after the removal of the sweep voltage. The output of integrator 41 is now superimposed upon the stored voltage for making the necessary fine corrections in the starting time of oscillator 25 for maintaining the predominant beat-frequency quite precisely at 500 kilocycles. The loss of automatic-frequency-control voltage will cause the lock-out gate 43 to reoperate for applying the search voltage.

Figure 4:
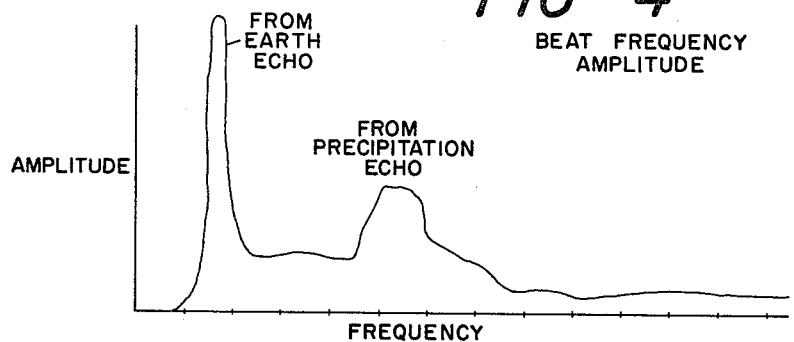
FIGURE 4 is a graph of the amplitudes of the beat-frequency signals which are derived from echo signals plotted against frequency.

An example of the amplitude distribution of beat-frequency signals is shown in FIGURE 4. Since the frequency of the transmitted signal is being increased linearly with time and since the reflection from the earth travels further than the reflection from the intervening regions of precipitation, the frequency of the reflected earth signal is always lower than that of the signal returned from the regions of precipitation. Also, the output of voltage tunable oscillator 25 is always at a lower frequency than the frequency of the predominant echo from the surface of the earth because the operation of receiver acquisition sweep circuit 42 causes the frequency of the oscillator signal to be increased during the searching phase. The discriminator 40 will therefore respond to a beat-frequency signal to approximately 500 kilocycles when the frequency of the oscillator signal is approximately 500 kilocycles below the average frequency of the earth echo. The reflected signal from any regions of precipitation travels a shorter distance and always has an instantaneous frequency that is higher than the frequency of the earth echo. If the frequency of the transmitted signal during the 3,000-microsecond periods of transmission increases 10 megacycles, the difference in beat-frequency signal between adjacent regions of precipitation separated in height by 1,000 feet is approximately 7 kilocycles.

In the present application, the frequency of the tunable oscillator 25 is controlled by the signal reflected from the most distant surface. This reflected signal is distinguished from the others in that it is the predominant signal in intensity and also it has the lowest frequency. The signal of lowest frequency need not be the predominant signal for the oscillator can be controlled by the signal of the lowest frequency which has substantial level of constant duration. Other sweep acquisition and control arrangements which may include voltage comparative methods, may be used to lock on different echo signals, for example, the signal from the nearest reflecting surface or the signal having the greatest intensity.

In order to determine the intensities of beat-frequency signals at different regions spaced in altitude at 1,000-foot intervals, a bank of parallel band-pass filters is connected to the output of intermediate-frequency amplifier 39. These band-pass filters have a pass band of approximately 7 kilocycles. The outputs of the band-pass filters are connected to detectors which develop a voltage in proportion to the amplitude of the signal passed through the respective filters. Band-pass filter 44 and detector 45 are responsive to low frequency beat-frequency signals covering the range of frequencies about 500 kilocycles which correspond to the frequency range of the earth beat-frequency signal. Since the surface of the earth may be considered to have uniform reflecting qualities, the measured output of the detector 45 for the earth signal is used as a reference for determining the intensities of the outputs of the detectors for measuring precipitation.

The electronic scanner 46 is synchronized with the scanning of antenna 24 by the application of pulses from system clock 27. The scanned analog information from the output of electronic scanner 46 is applied to a digital voltmeter 47 which is controlled by the system clock 27 for converting the information to digital values and for correlating the information with time and therefore with the scanning of antenna 24. The digital information is stored on tape or other data storage means 48 to give a record of the intensities of precipitation within the various 1,000-foot regions above the surface of the earth. This information is also indicated with respect to time so that the intensities can be correlated with the areas above the earth which are being scanned. The stored data can be periodically transmitted by known means and applied to maps for interpretation.

Although this invention has been described with respect to particular embodiments thereof, it is not to be so limited, as changes and modifications may be made therein which are within the spirit and scope of the invention as defined by the appended claims.

We claim:

1. A pulsed frequency-modulated radar system for measuring directly the distances between a reference reflecting region and other reflecting regions spaced therefrom in line with the radar system comprising, radar transmitting means, radar receiving means including a discriminator, a mixer, and a local tunable oscillator for applying local signal to said mixer, said mixer being responsive to the simultaneous application of reflected signals from said reflecting regions and said local signal for developing a beat-frequency signal for each of said reflecting regions, said beat-frequency signal for said reference reflecting region being used as a reference beat-frequency signal, said discriminator being responsive to develop a control voltage over a predetermined frequency range of said reference beat-frequency signal, timing means for enabling alternately said transmitting means and said receiving means, acquisition sweep circuits for varying the frequency of said oscillator at a predetermined rate until said reference beat-frequency signal is within said predetermined frequency range, said sweep circuits being enabled to vary the frequency of said oscillator in response to the operation of said timing means to its state for enabling said receiving means, means responsive to the application of said reference beat-frequency signal within said predetermined frequency range to said discriminator to transfer the control of the frequency of said oscillator from said sweep circuits to said discriminator so that the frequency of said tunable oscillator is determined by the frequency of said reference beat-frequency signal for maintaining the frequency thereof constant independent of the distance between said radar system and said reference reflecting region, and means for measuring the frequencies of the beat-frequency signals which are derived from said other reflecting regions to determine the distance between said reference reflecting region and said other reflecting regions.

2. A pulsed frequency-modulated radar system for measuring directly the distance between a remote good reflector and intervening inferior reflectors comprising, radar transmitting means, radar receiving means including a discriminator, a mixer, and a local tunable oscillator for applying local signal to said mixer, said mixer being responsive to the simultaneous application of reflected signal from said good reflector and said local signal for developing a beat-frequency signal, said discriminator being responsive to develop a control voltage over a predetermined frequency range of said beat-frequency signal, timing means for enabling alternately said transmitting means and said receiving means, acquisition sweep circuits for varying the frequency of said oscillator at a predetermined rate until said beat-frequency signal is within said predetermined frequency range, said sweep circuits being enabled to vary the frequency of said oscillator in response to the operation of said timing means to its state for enabling said receiving means, means responsive to the application of beat-frequency signal within said predetermined frequency range to said discriminator to transfer the control of the frequency of said oscillator from said sweep circuits to said discriminator so that the frequency of said tunable oscillator is determined by the frequency of said beat-frequency signal for maintaining the frequency thereof constant independent of the distance between said radar system and said good reflector, and means for measuring frequencies of other beat-frequency signals developed in said mixer by application thereto of signal derived from said intervening reflectors to determine the distances between said good reflector and said inferior reflectors.

3. A radar system for measuring distances directly from a remote good reflecting surface to intervening inhomogeneous regions comprising, means for generating a continuous series of frequency-modulated signal pulses, means for directively radiating said signal pulses to said distant reflecting surface, means at intervals between periods of transmission for receiving a predominant echo signal from said distant reflecting surface and other weaker echo signals from said intervening regions, means for developing a local signal varying in frequency at the rate of frequency variation of said radiated signal, mixing means responsive to the application of said local signal and said predominant echo signal to produce a predominant beat-frequency signal and responsive to the additional application of said other echo signals to produce other weaker beat-frequency signals, means responsive to the application of said predominant beat-frequency signal for developing an automatic-frequency-control voltage, means responsive to the application of said automatic-frequency-control voltage for controlling the mean frequency of said local signal as required to maintain the frequency of said predominant beat-frequency signal constant, the mean frequency of said local signal being varied with changes in distance between said radar system and said reflecting surface to establish said constant predominant beat-frequency signal as a reference corresponding to the position of said reflecting surface, and means for measuring the frequencies of said other beat-frequency signals, the frequencies of said other beat-frequency signals varying directly with the distance between said good reflecting surface and said respective intervening inhomogeneous regions.

4. A pulsed frequency-modulated radar system for measuring directly distance from a good reflecting surface that is remote from the position of the system to intervening particle clouds which reflect signals with less intensity than the intensity of the signal from said reflecting surface comprising, transmitting circuits and receiving circuits having common circuits including a voltage tunable oscillator, timing pulse generating means for enabling said transmitting circuits repeatedly for predetermined intervals and for applying a sweeping control voltage during the intervals of operation to said tunable oscillator, said enabled transmitting circuits radiating frequency-modulated signal originating in said tunable oscillator to said reflecting surface, said receiving circuits during periods between said predetermined intervals receiving reflected signals from said reflecting surface and from said intervening particle clouds, said receiving circuit mixing said reflected signals with signal from said tunable oscillator to develop beat-frequency signals, said receiving circuits including a discriminator responsive to application of the predominant beat-frequency signal as derived from the reflected signal of said good reflecting surface to develop an automatic-frequency-control voltage which varies from a predetermined normal voltage as a function of the variation in the frequency of said predominant beat-frequency signal from a predetermined frequency, means for applying the sum of said sweeping control voltage and said automatic-frequency-control voltage to said tunable oscillator during said periods of reception of said reflected signal, said automatic-frequency-control voltage maintaining the mean frequency of said predominant beat-frequency signal at said predetermined frequency for a reference, means responsive to the application of said beat-frequency signals from the output of said receiving circuits for determining the frequencies thereof, the frequencies of said beat-frequency signals derived from the reflected signal of said particle clouds indicating the distances between respective ones of said intervening particle clouds and said reflecting surface.

5. A pulsed frequency-modulated radar system for measuring the distances from the earth's surface to respective regions of precipitation independent of the distance of the position of said system from the earth's surface comprising, transmitting means for radiating frequency-modulated signal to the earth's surface, receiving means for receiving a predominant echo signal from said earth's surface and weaker echo signals from said precipitation, timing means for enabling alternately said transmitting means and said receiving means, said receiving means including means for converting said predominant echo signal into a predominant beat-frequency signal and said weaker echo signals into weaker beat-frequency signals, said beat-frequency signals having frequency differences proportional to respective instantaneous frequency differences between said echo signals, automatic-frequency-control means responsive to application of said predominant beat-frequency signal for maintaining the frequency thereof at a constant predetermined frequency so that said weaker beat-frequency signals have frequencies proportional to the distances between the earth's surface and said respective regions of precipitation from which said beat-frequencies were derived, and means for determining within predetermined ranges of frequencies the frequencies of different ones of said weaker echo signals for determining directly the distances from the surface of the earth to regions which contain precipitation.

6. A radar system for locating regions of precipitation according to claim 5 having means for measuring the strength of the echo signal reflected from the earth's surface and the respective strengths of the weaker echo signals reflected from said regions of precipitation, the relative strengths of said weaker echo signals with reference to said echo signal from the earth's surface indicating the densities of precipitation in said respective regions.

References Cited in the file of this patent
UNITED STATES PATENTS
2,537,593   Landon et al. _____ Jan. 9, 1951